Nov. 8, 1960 E. R. ROBSON 2,959,643

MAGNETIC ERASE HEAD

Filed March 29, 1957

INVENTOR.
Eric R. Robson

BY Morris A. Rabkin

ATTORNEY.

United States Patent Office 2,959,643

Patented Nov. 8, 1960

2,959,643

MAGNETIC ERASE HEAD

Eric Richard Robson, Collingswood, N.J., assignor to Radio Corporation of America, a corporation of Delaware Filed Mar. 29, 1957, Ser. No. 649,528

3 Claims. (Cl. 179—100.2)

This invention relates to magnetic heads, and particularly to magnetic heads especially useful for erasing or demagnetizing magnetic recording media.

Adequate erasure requires that any previous record on a magnetic recording medium be entirely removed prior to further recording thereon. It has become conventional to use either alternating or direct current magnetic fields for erasing a magnetic recording medium. Magnetic fields that are established in the recording medium in order to obtain adequate erasure must ordinarily be of much greater intensity than the magnetic fields necessary for recording information on the medium.

Electromagnetic devices having energizing coils are conventionally used for generating magnetic fields for record erasing purposes. The electric power necessary to develop magnetic fields of requisite intensity to effect erasure may cause excessive heating in the electromagnetic field generating device. The magnetic tape which is being erased may possibly be scorched or burned in the process of erasure. The danger of damage to the recording medium by burning becomes more pronounced if the medium is not moving with respect to the erasing device.

It is considered most desirable to use alternating magnetic fields established by alternating current of a frequency considerably higher than the frequency of the signals recorded on the medium for erasing purposes. For video recording purposes, an alternating erase current having a frequency of several megacycles may be used. Such alternating currents give rise to hysteresis and eddy-current losses in the device for establishing an erasing field so as again to cause excessive heating thereof. Also, the efficiency of conventional devices for providing an erasing field is very low when such devices are energized with high frequency alternating currents.

Past attempts to secure adequate erasure of a magnetic recording medium without the need for energizing power of large magnitude have involved providing devices which establish a plurality of discrete magnetic fields of low intensity. Such devices have, however, been bulky and expensive.

The present invention provides an improved magnetic erase head which operates in a different manner from conventional magnetic erase heads. In accordance with the invention, the magnetic field, which is established around a conductor by the passage of a current therethrough, is directly applied to the magnetic record medium in a manner to insure adequate erasure of any record previously impressed thereon. Briefly described, the invention provides a conductor having a configuration presenting a plurality of edges which successively engage a magnetic record medium passing thereover. The conductor may, for example, have a serpentine shape. A body of magnetizable material is provided to support the conductor and maintain it in a desired positional relationship with respect to the magnetic record medium to be erased. The supporting body cooperates with the conductor in guiding the magnetic field for erasing the medium.

It is, therefore, an object of the present invention to provide an improved magnetic head.

It is a further object of the present invention to provide a magnetic erase head which is highly efficient in operation and consumes little electrical power.

It is a still further object of the present invention to provide a magnetic erase head that is capable of efficiently utilizing high frequency energizing currents.

It is a still further object of the present invention to provide a magnetic erase head which is inexpensive and convenient to manufacture.

Other objects and advantages of the present invention will, of course, become apparent and immediately suggest themselves to those skilled in the art to which the invention is directed from a reading of the following description in connection with the accompanying drawing in which.

Figure 1:
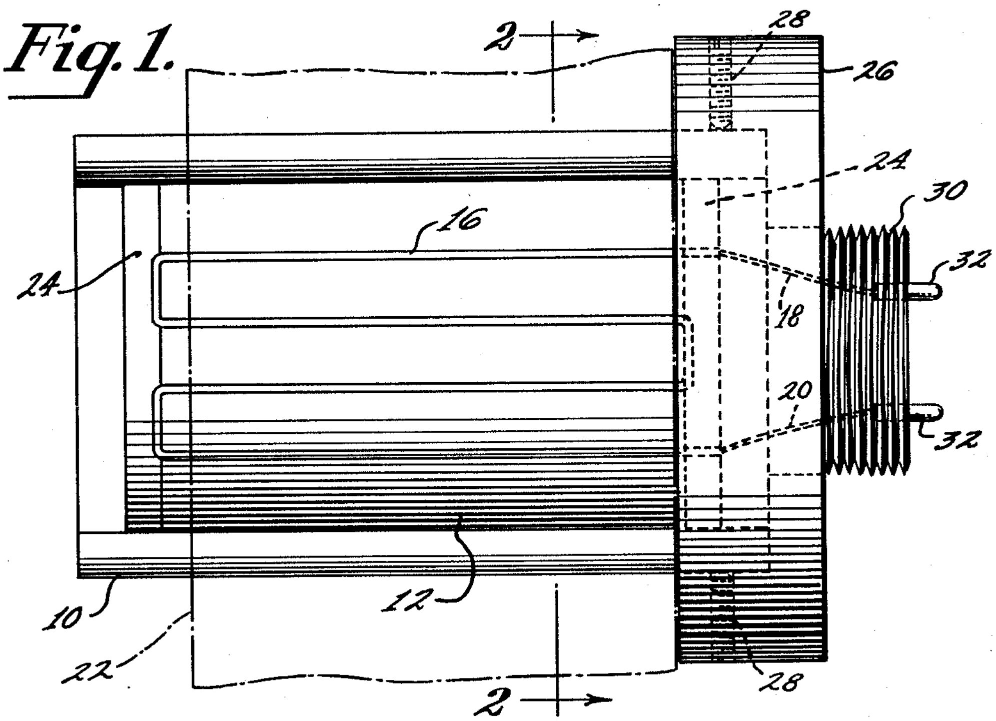
Fig. 1 is a plan view of a magnetic erase head constructed in accordance with the present invention.

Referring to the drawings, a U-shaped member 10 of non-magnetic material, such as aluminum, provides a base for a body 12 of magnetizable material. In accordance with the invention, a ferrite is preferred. Ferrites are well known magnetic materials having the property of high magnetic permeability and high electrical resistivity. The ferrite selected for the body 12 is desirably a soft ferrite, as distinguishable from a hard or permanently magnetizable ferrite. Alternatively, any magnetizable material having high permeability may be used, such as materials which are nickel-iron alloys. This body 12 may initially be rectangular in shape and composed of ferrite material. It is desirable, should a magnetizable material other than a ferrite material be used, that the body 12 be composed of a plurality of thin laminations, the laminations being disposed perpendicular to the upwardly extending sides of the U-shaped member 10. The exposed surface 14 of the body 12 of ferromagnetic material is formed with a plurality of openings (slots) therein, such as slots, which extend along the length of the body and are spaced from each other in parallel relationship along the width of the body 12. These slots may be narrow and rectangular in shape as shown in the drawing. However, the slots may have a circular or trapezoidal cross-sectional configuration, among others. The configuration of the slots is selected to conform to the shape of the conductors to be secured therein as will be brought out below.

An elongated strip 16 of conductive material, such as copper or aluminum, is formed into a plurality of convolutions and inserted in the slots. The strips of conductive material have a rectangular configuration which conforms to the cross-setcional configuration of the slots. A plurality of magnetic field generating conductors, which are active in providing an erasing field, are provided by the portions of the strip of conductive material 16 extending longitudinally of the body 12. The leads 18 and 20 are connected to the ends of the conducted strip 16. A source of voltage is connected across these leads 18 and 20 so that current will flow through the convolution of the conductive strip 16. The strip therefore provides a plurality of paths for current flow in opposite directions along the length of the body 12 of ferrite material. The longitudinally extending portions of the conductive strip 16 are shown as being parallel to each other so that the current paths are parallel. These portions may desirably be angularly oriented with respect to each other. The width of the conductive strip 16 may suitably be twenty times the thickness of the strip along an edge thereof to permit the strip to carry a current of appreciable magnitude without causing any heating losses therein. A rectangular conductive strip five thousandths inch thick by one tenth inch wide may carry a suitable current of about five amperes.

When the conductive strip 16, ferrite body 12 and U-shaped member 10 are assembled, the exposed surface 14 of the body of ferrite and upper edges of the sides of the U-shaped member 10 may be shaped, by grinding, to have a slightly convex configuration. This surface 14 of the head is adapted to engage the magnetic record medium, which is shown in the drawing to be a conventional flexible tape 22, coated with a magnetic material. The tape 22 may be made to engage the surface 14 of the head by providing suitable tensioning means or pressure pads (not shown). The surface 14 thereby provides a tape guiding surface.

The conductive strip 16 may be cemented in the slots by means of some suitable organic cement. The ends of the body 12 of ferrite material may be secured in the U-shaped member by filling part of the area between the ends of the member 10 and ends of the body 12 with plastic material 24 which, thereafter, is set by heating. The exposed surface 14 of the head may be shaped after the conductive strips are secured in place in the slots and the body 12 of ferrite material is permanently mounted in the U-shaped member 10 by setting the plastic material 24.

A circular mounting plate 26 is fastened at one end of the U-shaped member 10 by means of set screws 28. The inner surface of the mounting plate 28 also serves to guide an edge of the tape 22. A threaded plug 30 having two prongs 32 is secured in the mounting plate 26. The leads 18 and 20 are soldered to different ones of the prongs 32. The erase head which has been described is suitable for mounting into a female plug in a tape recorder equipment.

The energizing currents of any desired frequency, from direct current to very high frequencies in the megacycle range, may be carried by the conductive strip 16. The current passes successively through the oppositely directed current paths defined by the convolutions of the conductive strip 16. These paths may be observed to be disposed transversely of the tape 22. Around and between each of the conductors there is established an active magnetic field which is suitable for erasing purposes. Thus, four intense, active field regions are provided, one around each longitudinally extending portion of the conductive strip 16 in the illustrated magnetic head. Since the magnetic field is also established between the conductors, the magnetic tape is continuously subjected to an erasing field as it passes over the head. Adequate erasure is therefore insured.

The illustrated magnetic head is also capable of generating magnetic fields of higher intensity and of higher frequency than conventional magnetic heads without heating to an extent to make scorching of the magnetic tape 22 possible. In conventional magnetic heads using ring type cores which have a field establishing signal gap, the majority of the active flux passes across the gap; only the fringe flux, which extends outwardly from the gap, passes through the magnetic recording medium. In the illustrated head, a ring of magnetic flux is established around each convolution of the conductive strip 16. All of this flux passes directly through the exposed surface 14 of the ferrite block and surrounds the exposed edge of each conductive strip 16. The highly permeable body of magnetic material in which the conductive strips are confined provides for low magnetic losses and confines flux established by each conductive strip to the region surrounding that strip. All of this flux passes through the exposed surface and therefore through the magnetic tape 22. Consequently, the magnetic head efficiently converts the current passing through the convolutions of the conductive strip 16 into flux for actively erasing the magnetic tape. Although the magnitude of the current flowing through the strip 16 may be higher than the energizing currents for conventional heads, the voltage and power necessary are very low. This efficient utilization of power and current permits sufficient flux to be generated for adequately erasing the tape without heating the head. The large mass of conductive material surrounding the conductive strip 16 also provides for ready dissipation of any heat that might be generated.

The resistivity of the ferrite material provides sufficient insulation between the convolutions of the conductive strip 16. If laminations of some other soft ferromagnetic materials are used, it would be desirable to provide insulation between the laminations and the convolutions of the conductive strip 16. The cement for securing the conductive strip 16 in the slot may be sufficiently insulated to provide such insulation.

Alternating currents of high frequency in the megacycle range may be used to energize the head. Hysteresis and eddy-current losses are minimized in that the length and area of the path of the magnetic flux generated by the high frequency alternating currents in the body 12 of ferromagnetic material is comparatively small. In conventional heads, the path of the flux extends through the entire core, whereas the flux is confined to the region immediately surrounding the conductive strip 16 in the illustrated head. It is believed that, at high frequency, the region in the body 12 of ferromagnetic material occupied by the magnetic flux is even smaller than at low frequencies. Due to the skin effect, the flux is confined more closely to the regions of the body 12 immediately surrounding the conductive strip 16. This skin effect may be theoretically attributed to secondary magnetic field generated by eddy-currents in the body 12, which increase in magnitude with frequency, and which tend to oppose the primary magnetic field due to current in the conductive strip. It is recognized that the losses due to eddy-currents and the hysteresis effect increase with the amount of ferromagnetic material exposed to the varying magnetic fields. Thus, these losses are minimized in magnetic heads constructed in accordance with this invention. The efficiency of the heads is, therefore, increased and the operation thereof at low temperatures is provided.

Substantially all of the flux, moreover, passes through the exposed surface 14 and into the tape. It will be noted that the exposed edges of the conductive strips are flush with the exposed surface 14 of the body of ferromagnetic material. Thus, the ferrite material guides the flux around the bottom edge of each of the strips, through the exposed surface 14 and around the exposed edge of each of the strips. Any alternating magnetic flux attempting to pass through the conductor tends to develop circulating currents in the conductor causing opposing fluxes therein. This has the effect of causing the conductive strip to have an effective permeability of less than unity. Therefore, substantially all of the magnetic flux is forced to take the desired path around each of the conductive strip convolutions, through the exposed surface 14 of the body 12 of ferromagnetic material and around the exposed edge of each of the convolutions of the strip 16. The above explained effects are believed to permit more active erasing flux to be established with less power than heretofore.

Figure 2:
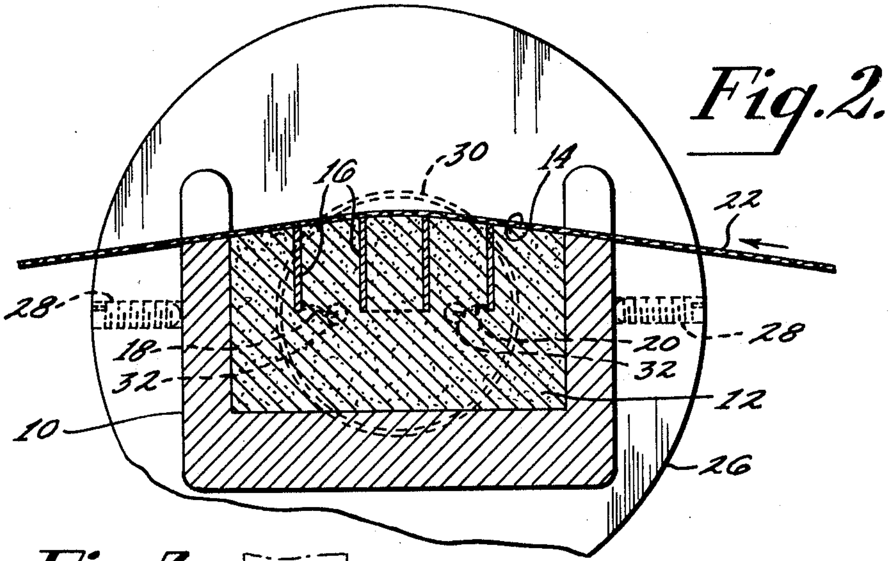
Fig. 2 is a sectional end view of the magnetic erase head shown in Fig. 1, the section being taken along the line 2—2 of Fig. 1.
Figure 3:
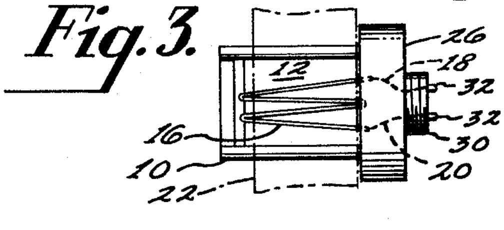
Fig. 3 is a plan view showing another embodiment of the invention.

Alternative constructions of a magnetic head embodying the present invention may be suggested. For example, the conductive strip 16 may be provided with different cross-sectional configurations to carry different magnitudes of energizing current. Trapezoidal and rectangular configurations for the conductive strip have been mentioned above. Moreover, the portions of the conductive strip 16 which are transversely disposed with respect to the path of the tape 22 may be disposed in angularly oriented, rather than parallel relationship. In the event that some remanent magnetization is produced in the tape due to the erase head, such magnetization will be angularly oriented with respect to the playback heads. The playback heads are sensitive primarily to longitudinally recorded information and will not be as responsive to the angularly oriented magnetization. Fig. 3 shows an erase head in which the portions of the conductive strip, which are disposed transversely to the direction of tape motion are in angular relationship to each other. In other respects the head shown in Fig. 3 is similar to the head shown in Figs. 1 and 2.

There has been described an improved and more efficient magnetic head which is especially suitable for erasing a magnetic record medium. Because of the simplicity of this head, it will be less expensive and more readily manufacturable than heads heretofore available.

What is claimed is:

1. A magnetic erase head comprising a body of magnetizable material having a surface adapted to cooperate with a magnetic record medium arranged to travel with respect to said body, and means for defining a path for an electric current in said body exposed from said body at said surface thereof, said path having a plurality of portions disposed transversely of said medium in angular relationship with respect to each other.

2. A magnetic erase head comprising a body of magnetizable material having a surface for engaging a magnetic record medium arranged to travel with respect to said body said body having a plurality of slots therein extending from said surface and disposed in a direction oriented at an acute angle with respect to the direction of travel of said medium adjacent ones of said slots being disposed at an angle with respect to each other and a continuous strip of conductive material disposed in said slots.

3. A magnetic erase head comprising a body of high permeability magnetic material presenting a surface for engagement with a magentic tape record arranged to travel across said body said body being disposed across the path of travel of said record and having a plurality of openings extending therein from said surface, each of said openings being disposed across the path of travel of said record at an angle other than ninety degrees with respect to said path said openings being spaced from each other and a strip conductor disposed in said openings.

References Cited in the file of this patent

UNITED STATES PATENTS

| | | |
|---|---|---|
| 2,138,864 | Karasick | Dec. 6, 1938 |
| 2,445,459 | Snyder | July 20, 1948 |
| 2,535,712 | Wolfe | Dec. 26, 1950 |
| 2,615,097 | Camras | Oct. 21, 1952 |
| 2,650,352 | Childs | Aug. 25, 1953 |
| 2,680,156 | Thorensen | June 1, 1954 |